US009434826B2

(12) United States Patent
Humfeld (10) Patent No.: US 9,434,826 B2
(45) Date of Patent: Sep. 6, 2016

(54) GRAPHENE-AUGMENTED CARBON FIBER FOR AEROSPACE COMPOSITES

(71) Applicant: The Boeing Company, Chicago, IL (US)

(72) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/589,057

(22) Filed: Jan. 5, 2015

(65) Prior Publication Data
US 2016/0194463 A1    Jul. 7, 2016

(51) Int. Cl.
| A01K 1/015 | (2006.01) |
| C09J 7/02 | (2006.01) |
| B32B 9/04 | (2006.01) |
| C08J 5/06 | (2006.01) |
| C01B 31/04 | (2006.01) |
| C08J 5/24 | (2006.01) |
| D01F 9/12 | (2006.01) |

(52) U.S. Cl.
CPC ............. *C08J 5/06* (2013.01); *C01B 31/0438* (2013.01); *C08J 5/24* (2013.01); *D01F 9/12* (2013.01); *C08J 2300/00* (2013.01)

(58) Field of Classification Search
CPC ............... G01N 21/8422; G01N 2021/8472; G02F 2201/02; G01D 5/3538
USPC ...................................... 428/221, 337, 411.1
See application file for complete search history.

(56) References Cited

U.S. PATENT DOCUMENTS

| 8,647,548 B1 | 2/2014 | Humfeld |
| 8,715,609 B2 | 5/2014 | Humfeld et al. |
| 2011/0017587 A1 | 1/2011 | Zhamu et al. |

(Continued)

FOREIGN PATENT DOCUMENTS

| CN | 102409528 A | 4/2012 |
| CN | 103015157 A | 4/2013 |

(Continued)

OTHER PUBLICATIONS

Matei, Dan G. et al., "Functional Single-Layer Graphene Sheets from Aromatic Monolayers," Advanced Materials, 2013, 25, 4146-4151, Wiley-VCH Verlag GmbH & Co. KGaA, Weinhein, Germany.

(Continued)

*Primary Examiner* — William Cheung
(74) *Attorney, Agent, or Firm* — Ostrager Chong Flaherty & Broitman P.C.

(57) ABSTRACT

Composite materials with graphene-augmented carbon reinforcement fibers having a graphene film wrapped about one or more carbon fiber filaments. The graphene film is wrapped about the carbon fiber filaments in a spiral orientation and has amine groups formed on an outer surface of the graphene film and epoxide groups formed on at least one edge of the graphene film. The amine groups are formed in a functionalized area on the outer surface of the graphene film that is within about 10 microns from the at least one edge of the graphene film. The graphene film may also have holes formed through the graphene film. The graphene film may be wrapped around a single carbon fiber filament, a substantially cylindrical bundle of about 19 carbon fiber filaments, or a substantially rectangular bed of carbon fiber filaments formed from a plurality of carbon fiber tows.

47 Claims, 10 Drawing Sheets

(56) References Cited

U.S. PATENT DOCUMENTS

| | | |
|---|---|---|
| 2012/0077020 A1 | 3/2012 | Muramatsu |
| 2012/0298396 A1 | 11/2012 | Hong et al. |
| 2012/0330044 A1 | 12/2012 | Hou et al. |
| 2013/0034724 A1 | 2/2013 | Sodano |
| 2013/0164498 A1* | 6/2013 | Langone .................. B32B 5/28 428/141 |
| 2014/0121350 A1 | 5/2014 | You et al. |
| 2014/0308517 A1 | 10/2014 | Zhamu et al. |

FOREIGN PATENT DOCUMENTS

| | | |
|---|---|---|
| CN | 103614902 A | 3/2014 |
| CN | 103396586 B | 11/2014 |
| JP | 2008248457 A | 10/2008 |
| KR | 101436500 B1 | 10/2014 |
| WO | 2007130979 A2 | 11/2007 |
| WO | 2012058553 A2 | 5/2012 |
| WO | 2012094634 A2 | 7/2012 |
| WO | 2012094634 A3 | 7/2012 |
| WO | 2013191809 A1 | 12/2013 |
| WO | 2014172619 A1 | 10/2014 |

OTHER PUBLICATIONS

European Search Report in corresponding application No. EP 15188442.6, dated Apr. 6, 2016.

European Search Report in related application No. EP 15188441.8, dated May 20, 2016, of The Boeing Company.

Database WPI, Week 201433, Thomson Scientific, London, GB; AN 2014-H03644, XP002757211, Shanghai Inst. Technology, Mar. 5, 2014.

Database WPI, Week 201474, Thomson Scientific, London, GB; AN 2014-U10828, XP002757154, Korea Inst. Machinery & Materials, Oct. 17, 2014.

Database WPI, Week 201251, Thomson Scientific, London, GB; AN 2012-E63084, XP002757212, Harbin Inst. Technology, Apr. 11, 2012.

Database WPI, Week 201370, Thomson Scientific, London, GB; AN 2013-P18120, XP002757215, Univ. Tianjin Polytechnic, Apr. 3, 2013.

Database WPI, Week 200876, Thomson Scientific, London, GB; AN 2008-M91181, XP002757213, Mitsui Bussan KK. Oct. 16, 2008.

European Search Report in related application No. EP 15188443.4, dated May 13, 2016, of The Boeing Company.

Federico, Bosia et al., "In Silico Tensile Tests and Design of Hierarchical Graphene Fibres and Composites," Physica Status Solidi. B, Basic Research, vol. 250, No. 8, Jul. 24, 2013, pp. 1492-1495.

USPTO Office Action mailed Jun. 23, 2016 in related U.S. Appl. No. 14/865,820.

* cited by examiner

FIG.10

GRAPHENE-AUGMENTED CARBON FIBER FOR AEROSPACE COMPOSITES

TECHNICAL FIELD

This disclosure generally relates to composite materials augmented with graphene, composite structures including component parts made from graphene-augmented composite materials, and methods for manufacturing graphene-augmented composite materials and composite structures with component parts made from graphene-augmented composite materials.

BACKGROUND

Composite materials are used in the manufacture of a wide variety of structures and component parts due to their high strength and rigidity, low weight, corrosion resistance and other favorable properties. For example, in the aerospace industry, composite materials are becoming widely used to manufacture aerospace structures and component parts for aerospace structures such as aircraft ribs, spars, panels, fuselages, wings, wing boxes, fuel tanks, tail assemblies and other component parts of an aircraft because they are lightweight and strong, and therefore provide fuel economy and other benefits. As used herein, the term "composite structure" means a structure that is manufactured, fabricated or assembled, in whole or in part, from one or more component parts made from composite materials (i.e., composite components) including, without limitation, aerospace structures.

One type of composite material commonly used in the aerospace industry is carbon fiber reinforced plastic ("CFRP"). CFRP generally comprises one or more composite layers or plies laminated together to form a sheet, laminate or layup. Each of the composite layers or plies comprises a reinforcement material and a matrix material. The matrix material surrounds, binds and supports the reinforcement material, and is generally a non-conductive polymer such as an epoxy resin. For aerospace applications, an aerospace grade resin is used as the matrix material, typically having four (4) epoxide groups in each epoxy monomer molecule to form multiple connections. The reinforcement material provides structural strength to the matrix material and the CFRP, and generally consists of strands of carbon fiber or carbon filaments, which are electrically conductive. Carbon fibers are typically formed as carbon tows comprising a defined number of carbon filaments. For aerospace applications, carbon tows may comprise bundles of carbon filaments ranging from about 1,000 to about 24,000 carbon filaments; carbon tows having up to about 300,000 carbon filaments may be used in other applications.

It is desirable to increase the amount of carbon in CFRP to further improve mechanical and/or electrical properties of composite structures without increasing weight or disturbing other desirable properties. But, simply increasing the amount of carbon fiber reinforcement material in CFRP does not meet this goal and is not cost efficient. Other forms of carbon, such as graphene, which has exceptional mechanical strength and thermal conductivity, would have beneficial effects in composite structures. Graphene is a hexagonal array of carbon atoms extending over two dimensions (i.e., it is one atom thick) that is typically produced in small flakes (or nanoplatelets). Each carbon atom in graphene is covalently bonded to three other carbon atoms, providing exceptional strength. However, mixing graphene into an epoxy resin comprising carbon fibers makes the epoxy resin weaker to strain in every direction because graphene will not bond with the carbon fibers and does not interact much with the epoxy resin.

Accordingly, there is room for improving the mechanical and electrical properties of composite structures and related methods for manufacturing composite structures that provide advantages over known composite structures and manufacturing methods.

SUMMARY

The foregoing purposes, as well as others, are achieved by integrating graphene-augmented carbon fibers comprising a graphene film disposed about one or more carbon fiber filaments into CFRP composite materials as a supplement to or as a replacement for carbon reinforcement fibers. The graphene film is wrapped about the one or more carbon fiber filaments in a spiral orientation. In certain embodiments, the graphene film may be functionalized with amine groups formed on an outer surface of the graphene film, epoxide groups formed on at least one edge of the graphene film, and/or holes formed through the graphene film. The amine groups are formed in a functionalized area on the outer surface of the graphene film that is within about 10 microns from the at least one edge of the graphene film.

In one embodiment, the graphene film is wrapped around a single carbon fiber filament to form a graphene-augmented carbon fiber that may be used in the formation of CFRP. The graphene-augmented carbon fiber has a highly ordered carbon structure on the outermost few nanometers of the graphene-augmented carbon fiber's diameter resulting from the wrapped graphene film. The surface of a fiber filament is typically more crystalline than its interior, with increased modulus resulting in the entire load being carried near the surface. This embodiment artificially increases the diameter of the carbon fiber filament with perfect crystallinity on its surface, resulting in increased modulus and improved strength between the graphene-augmented carbon fiber and resin matrix material in the CFRP. The optional functionalization of the graphene film with amine groups on an outer surface of the graphene film, epoxide groups on at least one edge of the graphene film and/or holes formed through the graphene film, improves the interaction between the graphene-augmented carbon fiber and the resin material in the CFRP to the point that the graphene-augmented carbon fiber becomes part of the macromolecular resin complex.

In another embodiment, the graphene film is wrapped around a substantially cylindrical bundle of 19 carbon fiber filaments. The graphene film has holes that are substantially circular with a diameter of about 1-20 nanometers formed through the graphene film. The graphene film wraps around and squeezes the bundle of 19 carbon fiber filaments to its minimum size to form a close-packed super-filament bundle. The close-packed super-filament bundle may then be bundled with other close-packed super-filament bundles to form carbon fibers having 3,000 (158×19) or 6,000 (316×19) close-packed super-filament bundles that may be used in the formation of CFRP. Bundles of 7, 19, 37 or 61 carbon fiber filaments, or any other suitable quantity of carbon fiber filaments, may be wrapped with graphene film. In the vicinity of the graphene film, the resin material in the CFRP is a macromolecule comprised of a base amine monomer (such as 44'DDS) and a base epoxy monomer (such as Bisphenyl F), which may penetrate holes in the graphene film in each close-packed super-filament bundle. The optional functionalization of the graphene film with amine groups on an outer surface of the graphene film, epoxide groups on at least one edge of the graphene film and/or holes formed through the graphene film, provides multiple connections between the graphene film and the resin matrix material in the CFRP.

In yet another embodiment, the graphene film is wrapped around a substantially rectangular bed of carbon fiber filaments separated from a plurality of carbon fiber tows. A resin film is applied on top of the wrapped substantially rectangular bed of carbon fiber filaments and heated to permit the resin to penetrate through holes in the graphene film and spread through the bed of carbon fiber filaments. The wrapped substantially rectangular bed of carbon fiber filaments may then be stacked on one or more additional wrapped substantially rectangular beds of carbon fiber to form a prepreg laminate with two layers of graphene film between adjacent stacked beds of carbon fiber filaments. In the vicinity of the graphene film, the resin in the CFRP is a macromolecule comprised of a base amine monomer (such as 44'DDS) and a base epoxy monomer (such as Bisphenyl F), which may penetrate holes in the graphene film. The optional functionalization of the graphene film with amine groups on an outer surface of the graphene film, epoxide groups on at least one edge of the graphene film and/or holes formed through the graphene film, provides multiple connections between the graphene film and the resin matrix material in the CFRP.

In accordance with a method of the disclosure, a method of increasing strength, stiffness and modulus of a composite material comprising carbon reinforcement fibers and a resin matrix material is provided. Graphene-augmented carbon fibers as disclosed herein are combined with a resin matrix material to form a prepreg material, and the prepreg material is cured to form the composite material with increased strength, stiffness and modulus.

Composite structures, including aerospace structures, comprising component parts made with composite materials having the disclosed graphene-augmented carbon fibers, aircraft comprising such composite structures, and methods for making such composite structures are also considered to be within the scope of the present disclosure. Other objects, features, and advantages of the various embodiments in the present disclosure will be explained in the following detailed description with reference to the appended drawings.

DETAILED DESCRIPTION

In the following detailed description, various embodiments of composite materials are described with reference to aerospace structures to illustrate the general principles in the present disclosure. It will be recognized by one skilled in the art that the present disclosure may be practiced in other analogous applications or environments and/or with other analogous or equivalent variations of the illustrative embodiments. For example, the composite materials may be used in any industry that seeks the benefits of strong and light-weight materials. One of ordinary skill in the art will recognize and appreciate that the composite materials and related methods of increasing strength, stiffness and modulus in composite materials of the disclosure can be used in any number of applications involving such vehicles and structures. It should also be noted that those methods, procedures, components, or functions which are commonly known to persons of ordinary skill in the field of the disclosure are not described in detail herein.

Figure 1:
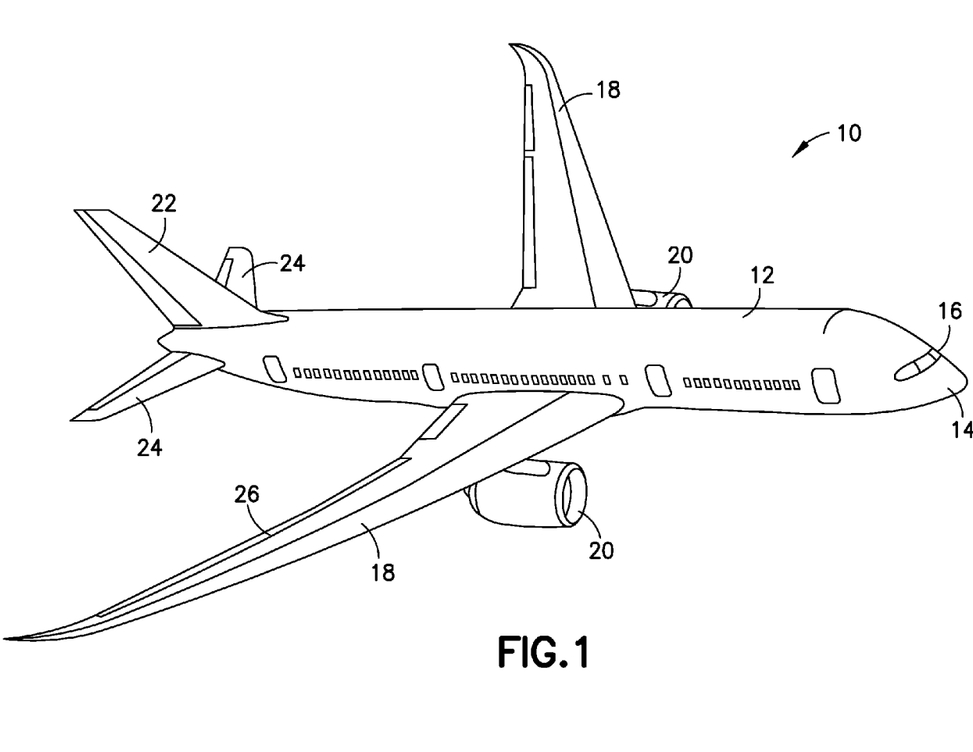
FIG. 1 is an illustration of a perspective view of an aircraft that may incorporate the composite materials disclosed herein.

Referring more particularly to the drawings, FIG. 1 is an illustration of a perspective view of an exemplary aircraft 10 that may incorporate a composite structure 26 comprising a composite material having graphene-augmented carbon fibers in accordance with this disclosure. As shown in FIG. 1, the aircraft 10 comprises a fuselage 12, a nose 14, a cockpit 16, wings 18, one or more propulsion units 20, a vertical tail portion 22, and horizontal tail portions 24. Although the aircraft 10 shown in FIG. 1 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable vehicles or items having composite structures.

Figure 2:
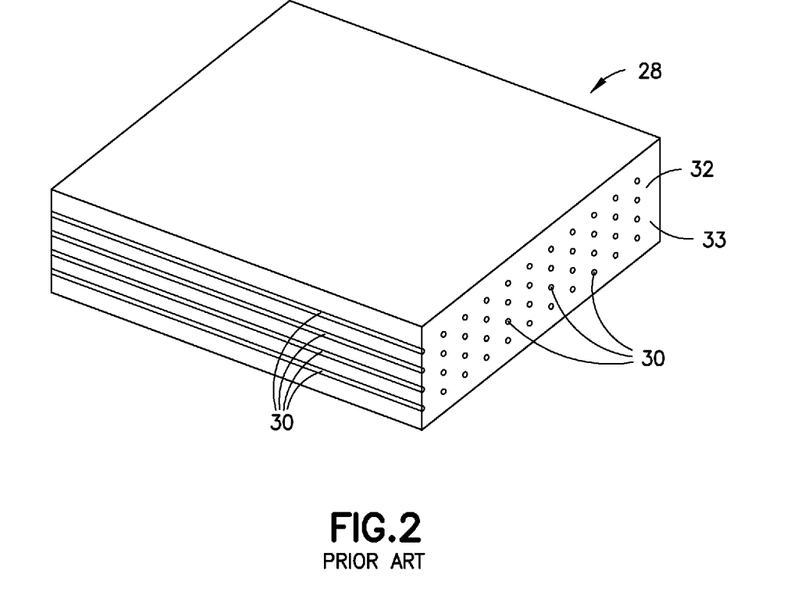
FIG. 2 is an illustration of a typical composite material comprising carbon reinforcement fibers and a matrix material.

The composite structures 26 may be any type of structure that is manufactured, fabricated or assembled, in whole or in part, from one or more component parts made from composite materials. An exemplary illustration of a typical CFRP-type of composite material 28 is shown in FIG. 2 comprising a single layer of carbon reinforcement fibers 30 impregnated with a matrix material 32. The matrix material 32 surrounds, binds and supports the carbon reinforcement fibers 30 and is generally a non-conductive polymer such as an epoxy resin 33. For aerospace applications, an aerospace-grade resin is used as the matrix material 32, having four (4) epoxide groups in each epoxy monomer molecule to form multiple connections. Typically, the molecules are tri- or tetra-functional epoxies and bifunctional amines. Since one component is at least tri-functional, the result of the extensive epoxy-amine chemical reaction is a dendrimeric structure, which provides strength and toughness greater than non-aerospace grade bi-functional epoxy resins. Aerospace-grade resins suitable for the composite materials of this disclosure include epoxy-amine resin systems having a cure temperature in the range of about 250° F. to 355° F. Examples of such resins include, but are not limited to, a toughened epoxy resin 3900-2 available from Toray Resin Company, a division of Toray Industries, Inc., Troy, Mich., and the CYCOM® 977-3 and CYCOM® 5320-1 curing resins available from Cytec Industries Inc., West Paterson, N.J.

In view of its exceptional properties, graphene has attracted tremendous research interest in recent years, particularly in the field of electronics. Graphene can now be made flawlessly or with controlled flaws in a molecular monolayer of unlimited length and width (i.e., it may be scaled for roll-to-roll processing), with grain size on the order of 100 nanometers. The controlled flaws can include amino-terminated groups (or amine groups) or other chemical functionalization with controlled density. Graphene may also be formed with holes having a predetermined size and location. In addition, graphene can now be oxidized by weak acids in whole or in part to form graphene derivatives, such as graphene oxide (GO) and reduced graphene oxide (rGO), having epoxide groups throughout the graphene, on part of the graphene, or only at its edges.

Figure 3:
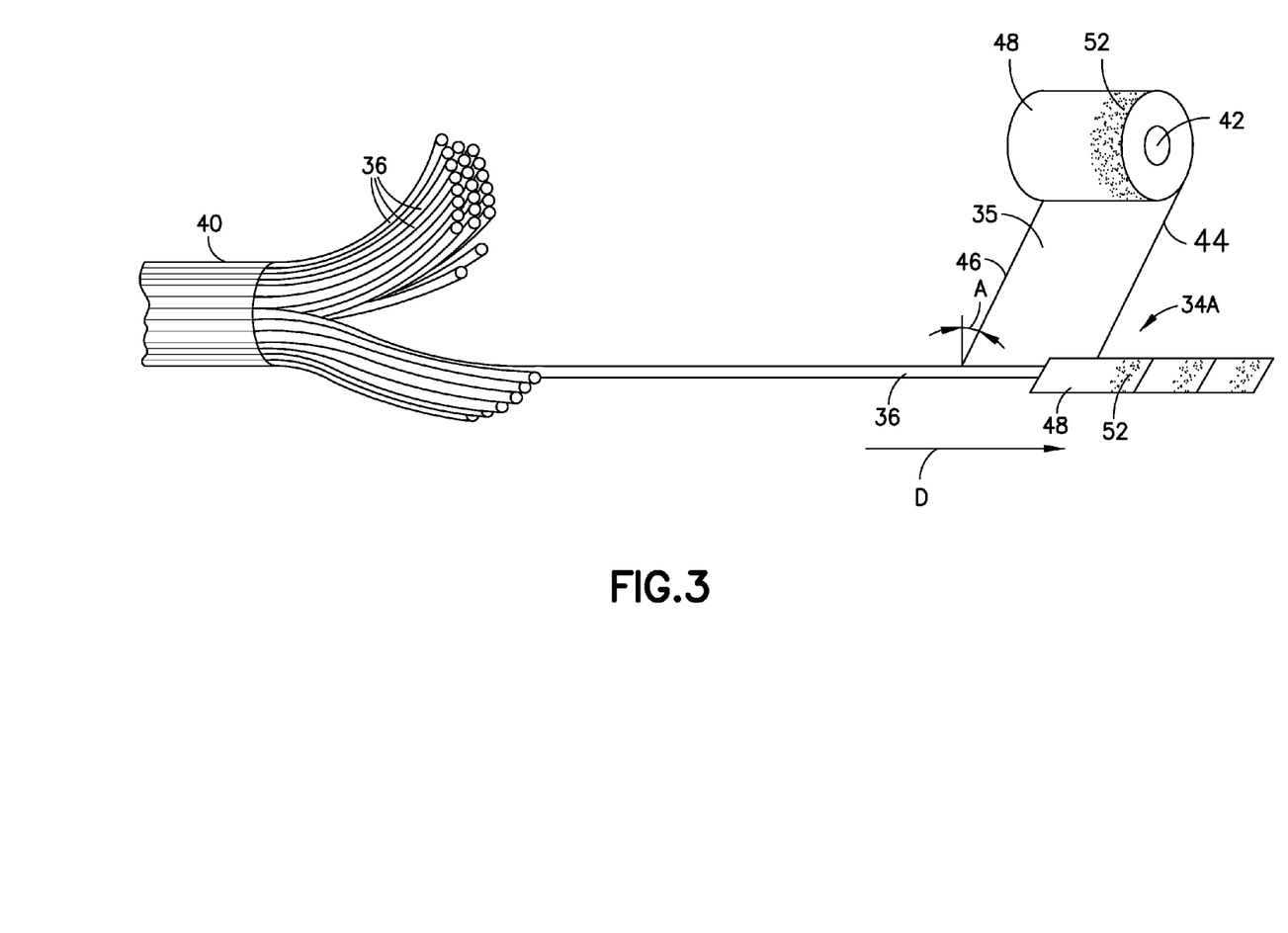
FIG. 3 is an illustration of one embodiment of a graphene-augmented carbon fiber and exemplary equipment for producing a graphene-augmented carbon fiber in accordance with this disclosure.
Figures 4, 4A:
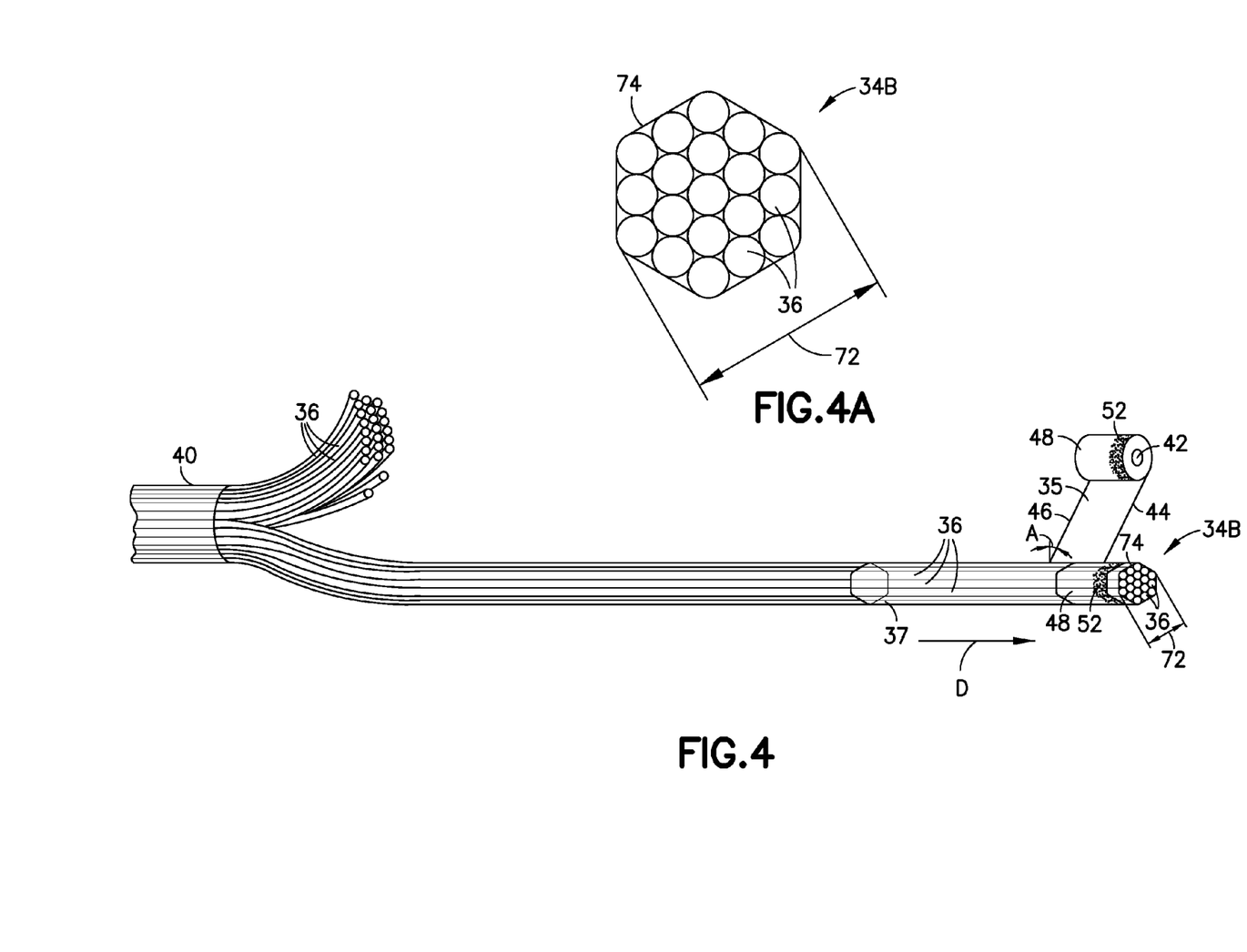
FIG. 4 is an illustration of another embodiment of a graphene-augmented carbon fiber and exemplary equipment for producing a graphene-augmented carbon fiber in accordance with this disclosure.
FIG. 4A is an illustration of a cross-section of the graphene-augmented carbon fiber shown in FIG. 4.
Figures 5, 5A:
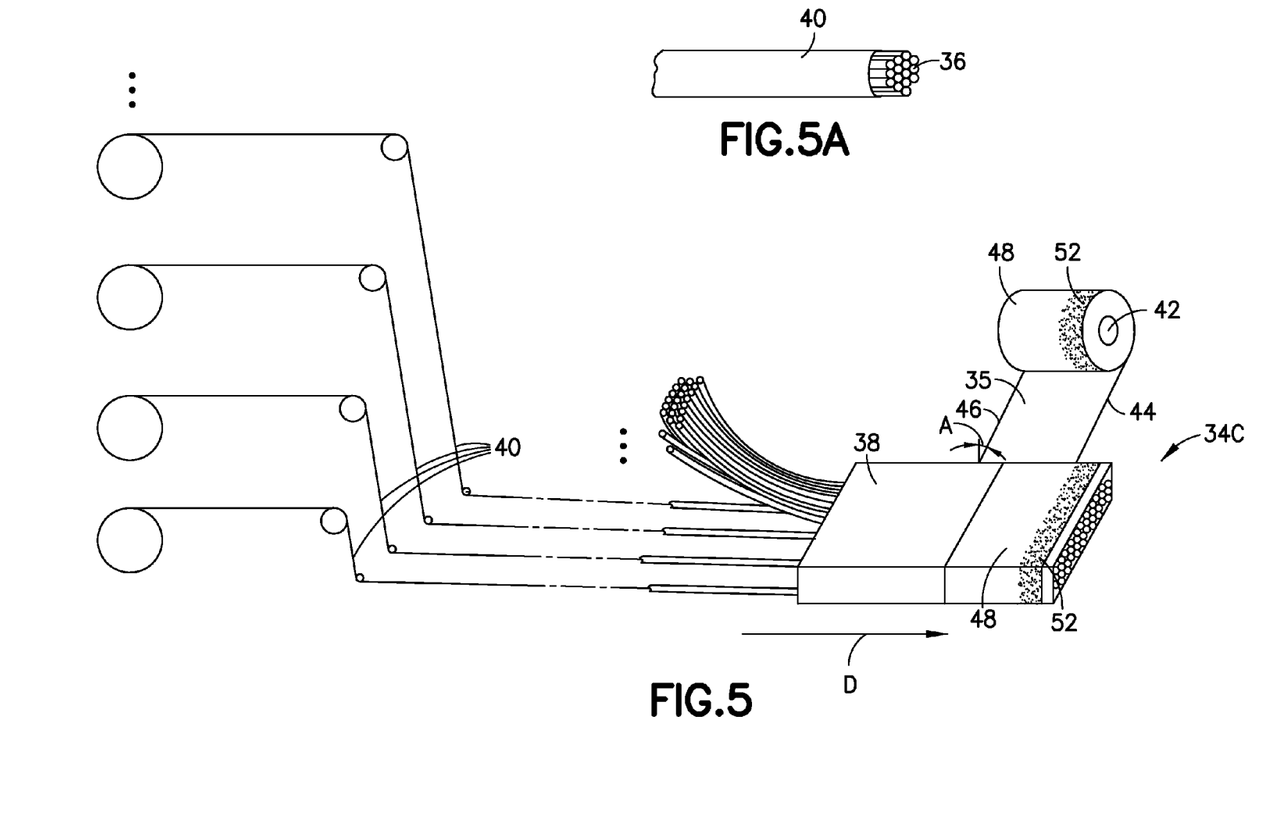
FIG. 5 is an illustration of yet another embodiment of a graphene-augmented bed of carbon fiber filaments and exemplary equipment for producing a graphene-augmented bed of carbon fiber filaments in accordance with this disclosure.
FIG. 5A is an illustration of carbon tow used in the production of the graphene-augmented bed of carbon fiber filaments shown in FIG. 5.

It has been determined that integrating graphene-augmented carbon fibers 34A, 34B or a graphene-augmented bed 34C of carbon fiber filaments 36 as disclosed herein, comprising a graphene film 35 disposed about at least one carbon fiber filament 36, into CFRP-type composite materials 28 (like the one shown in FIG. 2) as a supplement to or as a replacement for carbon reinforcement fibers 30 provides substantial benefits to the strength, stiffness and modulus of the composite materials 28. FIGS. 3-5 illustrate three exemplary embodiments of graphene-augmented carbon fibers 34A, 34B and a graphene-augmented bed 34C of carbon fiber filaments 36, respectively, wherein a graphene film 35 is wrapped about a single carbon fiber filament 36 (FIG. 3), a substantially cylindrical bundle 37 of either 7, 19, 37 or 61 carbon fiber filaments 36 (FIG. 4), for example, or any other suitable quantity of carbon fiber filaments, and a substantially rectangular bed 38 of a plurality of carbon fiber tows 40 each comprising a plurality of carbon fiber filaments 36. These embodiments are further described below.

Figure 6:
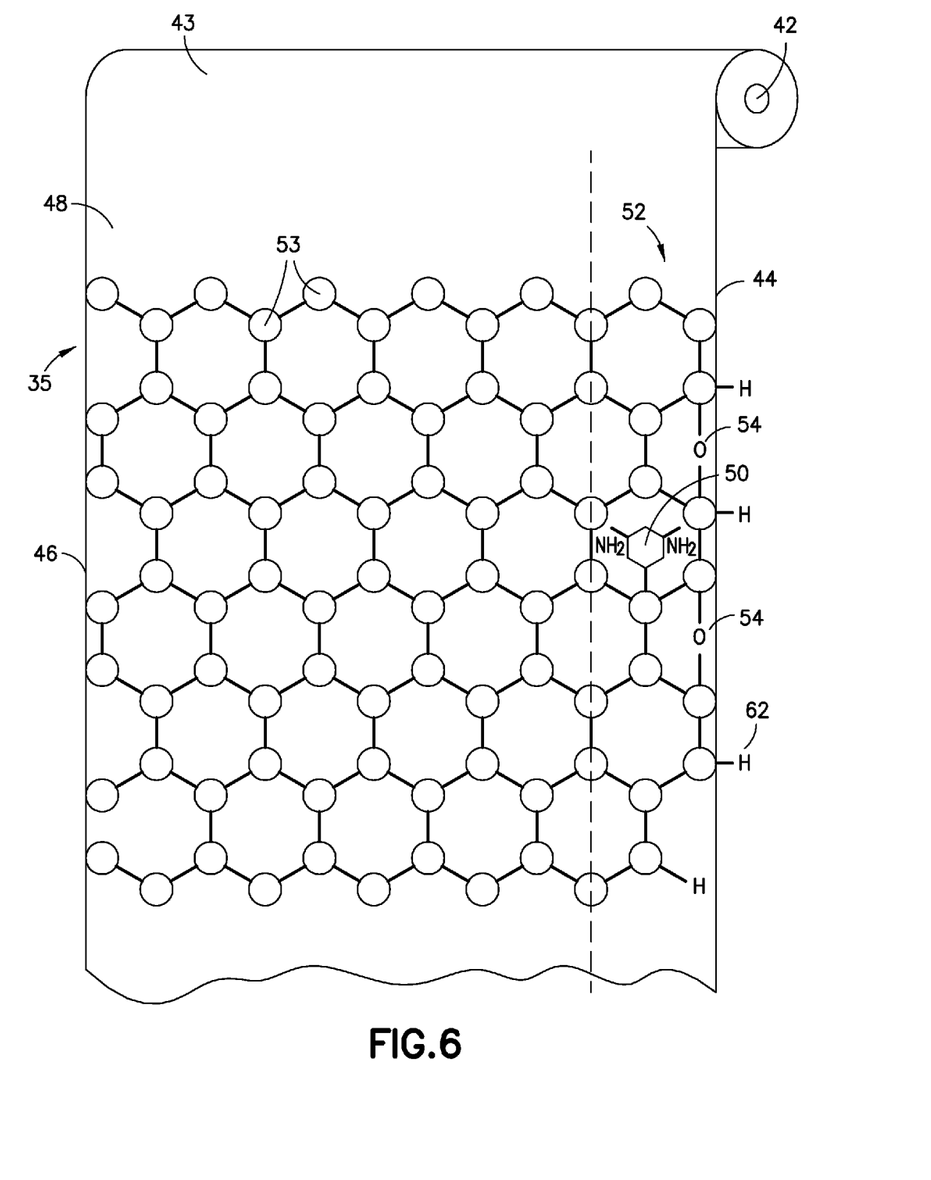
FIG. 6 is an illustration of one embodiment of a graphene film with amine group and epoxide group functionalization that may be used in the improved composite materials of this disclosure.

The graphene film 35 employed in all of the embodiments disclosed herein is formed as a long, thin graphene sheet having a width in the range of about 0.5 microns to about 100 microns from a first edge 44 to a second edge 46, and rolled on a spool 42 for dispensing about at least one carbon fiber filament 36. The graphene film 35 may include functionalization on an outer surface 48 of the graphene film 35 and/or at one or both of the first edge 44 and the second edge 46. FIG. 6 is a blown-up illustration of a roll 43 of functionalized graphene film 35 wound on a spool 42 having added amine groups 50 in a functionalized area 52 on the outer surface 48 of the functionalized graphene film 35, and added epoxide groups 54 on the first edge 44 of the functionalized graphene film 35. The functionalized area 52 preferably extends the length of the graphene film 35 and up to about 10 microns in from the first edge 44 (toward the second edge 46).

The amine groups 50 on the outer surface 48 of the graphene film 35 have a surface density of about 4.0E10 to about 2.0E12 groups per square millimeter (about 4.0E4 to about 2.0E6 groups per square micrometer or about 0.4 to about 2.0 groups per square nanometer) of the functionalized area 52. The surface density of amine groups 50 may also be described as about 0.1% to about 5.0% of carbon atoms 53 in the functionalized area 52 have amine groups 50 bonded thereto. That is, 1 to 50 carbon atoms 53 per 1,000 carbon atoms in the functionalized area 52 have an amine group 50 bonded thereto.

The graphene film 35 may be functionalized with amine groups 50 on the outer surface 48 by several methods including, for example, the methods disclosed in U.S. Publication No. 2014/0121350 A1 to YOU et al., published May 1, 2014, for preparing a polyimide-graphene composite material, and the method disclosed in Matei, Dan G. et al., "Functional Single-Layer Graphene Sheets from Aromatic Monolayers," *Advanced Materials*, 2013, 25, 4146-4151, WILEY-VCH Verlag GmbH & Co., Weinheim, Germany.

Figure 7:
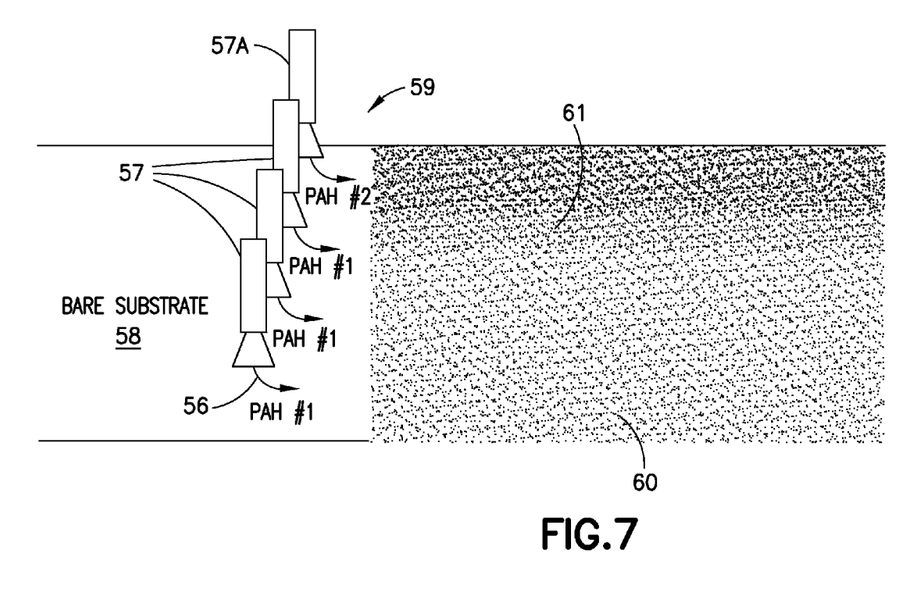
FIG. 7 is an illustration of exemplary equipment for producing a graphene film with amine group functionalization.

In one method of producing graphene film 35, illustrated in FIG. 7, polycyclic aromatic hydrocarbon (PAH) molecules 56 adsorb to a substrate 58, and the interactions of their aromatic rings cause them to form a self-assembled monolayer (SAM) 60. The remainder of each PAH molecule 56 beyond its first aromatic ring sticks up from the SAM 60. The PAH molecules 56 may be delivered to the substrate 58 via nozzles 57 arranged across a width of the substrate 58. By including a second species of PAH molecules with an amine group at some low concentration relative to the first PAH species, a SAM 60 with additional amine groups 50 can be formed. For example, one out of every 100 aromatic molecules may have an extra amine group 50 sticking up out of it. In FIG. 7, three of the four nozzles 57 deliver a first PAH species (PAH #1) and the fourth nozzle 57A positioned near one edge 59 of the substrate 58 delivers a second PAH species (PAH #2) so the amine groups 50 are positioned near the one edge 59, which becomes the first edge 44 in the graphene film 35. Some mixing occurs between the nozzles 57, 57A to form a gradient area 61 of increasing amine-functionalization toward the one edge 59. The surface of the substrate 58 that the PAH molecules adsorb to becomes the outer surface 48 of the graphene film 35. Electron irradiation is used to induce bonds between the aromatic molecules at the substrate 58 to form a carbon nanomembrane (CNM). Temperature induced annealing in a vacuum or under protective atmosphere will complete the conversion of CNM into graphene.

Other methods of adding amine groups 50 may be used, and any type of amine structure may be added including, for example, 4,4' diamino diphenyl sulfone; 1-(4-aminophenyl)-1,3,3-trimethylindan-5-amine; N,N-bis(4-aminophenyl)benzene-1,4-diamine; 4,4'-methylenedianiline; 4,4'-oxydianiline; 3,3'-[1,3-phenylenebis(oxy)]dianiline; 4,4'-(9H-fluorene-9,9-diyl)dianiline; 4,4'-[1,3-phenylenebis(oxy)]dianiline; 4,4'-methylenebis(2-ethylaniline); 3,3'-[(2,2-dimethylpropane-1,3-diyl)bis(oxy)]dianiline; 3,3'-[1,4-phenylenebis(methylene)]dianiline; 4,4'-sulfonylbis(N-methylaniline); 4,4'-[1,4-phenylenebis(oxy)]dianiline; 3,3'-sulfonyldianiline; aniline; 4,4'-(phenylphosphoryl)dianiline; 3-aminophenol; 4,4'-methylenedicyclohexanamine; 4,6-diethyl-2-methylbenzene-1,3-diamine; 2-(aminomethyl)-2,5,5-trimethylcyclohexanamine; 4,4'-thiodianiline; 2,2'-dimethylbiphenyl-4,4'-diamine; N-isopropyl-N'- phenylbenzene-1,4-diamine; N-(1,3-dimethylbutyl)-N'-phenylbenzene-1,4-diamine (Phenyl DMB); and N-cyclohexyl-N'-phenylbenzene-1,4-diamine (Phenyl CH).

Referring to FIG. 6, the graphene film 35 has a linear density of epoxide groups 54 formed on at least one of the first edge 44 and the second edge 46 of the graphene film 35, preferably on the side of the functionalized area 52, of about 7,000 to about 700,000 groups per millimeter (or about 0.007 to about 0.7 groups per nanometer, or about 7 to about 700 per micrometer). The density of epoxide groups 54 may also be represented as about 0.1% to about 10% of carbon atoms at the first edge 44 of the graphene film 35 have epoxide groups 54 bonded thereto. That is, 1 to 100 carbon atoms 53 per 1,000 carbon atoms 53 has an epoxide group 54 bonded thereto.

Graphene film 35 may be functionalized with additional epoxide groups 54 by oxidation. Graphene, in general, can be oxidized by weak acids in whole or in part to form graphene derivatives, such as graphene oxide (GO) and reduced graphene oxide (rGO), having epoxide groups 54 throughout the graphene derivative, on part of the graphene derivative, or only at its edges. The weak acid would first attack the edges 44, 46 of the graphene film 35 where there are hydrogen terminations 62. The amount of oxidation is determined by the acid strength and exposure time. Examples of weak acids include formic acid, acetic acid and hydrogen sulfide. It is noted that "weak" does not mean that acid has a high pH. Instead, an acid is described as weak if it is only partially ionized in solution. Exposing the amine-functionalized graphene film 35 to a solution of formic acid for up to 30 minutes and then cleaning with ethanol may provide the desired density of epoxide groups 54.

Other methods of adding epoxide groups 54 may be used, and any type of epoxide structures may be added including, for example, 2,2'-[propane-2,2-diylbis(4,1-phenyleneoxymethylene)]dioxirane; 2,2'-[methylenebis(4,1-phenyleneoxymethylene)]dioxirane; 2,2'-[methylenebis(2,1-phenyleneoxymethylene)]dioxirane; 2,2'-[ethane-1,1-diylbis(4,1-phenyleneoxymethylene)]dioxirane; (Bis M); 4-(oxiran-2-ylmethoxy)-N,N-bis(oxiran-2-ylmethyl)aniline; 2,2'-[thiobis(4,1-phenyleneoxymethylene)]dioxirane; 2,2'-[sulfonylbis(4,1-phenyleneoxymethylene)]dioxirane; 2,2'-[butane-1,4-diylbis(oxymethylene)]dioxirane; 3-(oxiran-2-ylmethoxy)-N,N-bis(oxiran-2-ylmethyl)aniline; 2,2'-oxybis(6-oxabicyclo[3.1.0]hexane); 2,2'-[1,4-phenylenebis(oxymethylene)]dioxirane; 2,2'-[prop-1-ene-1,2-diylbis(4,1-phenyleneoxymethylene)]dioxirane; 2,2'-[1,3-phenylenebis(oxymethylene)]dioxirane; 2,2'-[cyclohexane-1,2-diylbis(oxymethylene)]dioxirane; 2,2'-[(2,2-dichloroethene-1,1-diyl)bis(4,1-phenyleneoxymethylene)]dioxirane; 2,2'-[cyclohexane-1,4-diylbis(methyleneoxymethylene)]dioxirane; (Bis I); (Bis AF); (Bis Z); (Bis C); (Bis TMC); (Bis P); 2,2'-{propane-2,2-diylbis[(2,6-dibromo-4,1-phenylene)oxymethylene]}dioxirane; 7-oxabicyclo[4.1.0]hept-3-ylmethyl 7-oxabicyclo[4.1.0]heptane-3-carboxylate.

Figure 8:
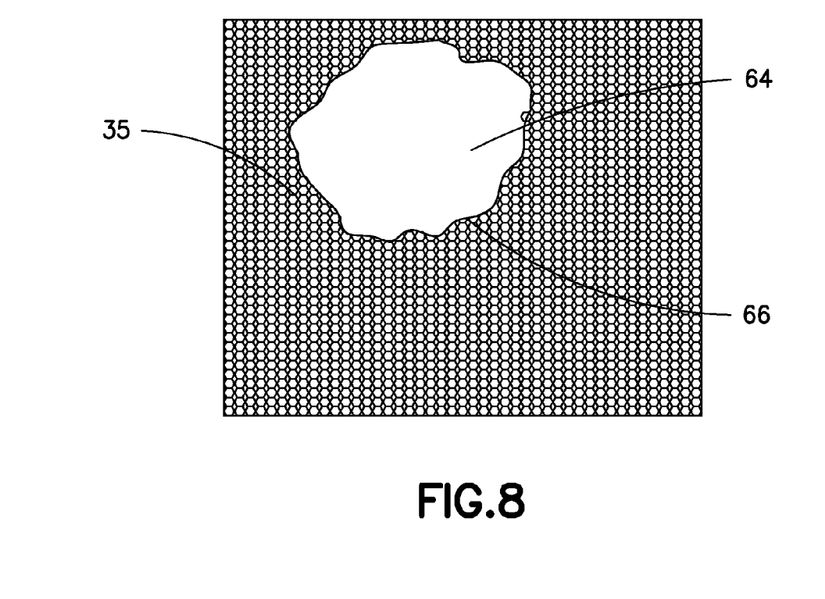
FIG. 8 is an illustration of a section of a graphene film that is functionalized with a hole.

Optionally, as shown in FIG. 8, graphene film 35 may be further functionalized by adding at least one hole 64 through the graphene film 35 to provide additional edges 66 where epoxide groups 54 can form. The at least one hole 64 may be formed by providing energy (such as with a laser) to remove molecules from the SAM prior to formation of the CNM, as disclosed herein. Preferably, the at least one hole 64 is formed in the graphene film 35 to have a substantially circular shape with a diameter of about 1-2 nanometers and a size of about 12-80 carbon atoms 37. That is, about 12-80 carbon atoms 37 are removed from the graphene film 35 to form the at least one hole 64 in the graphene film 35. The at least one hole 64 may be positioned anywhere on the graphene film 35. The graphene film has a density of holes 64 in the range of about 4E7 to about 4E10 holes per square millimeter, or about 1 hole per 1,000 to 1 million carbon atoms. The holes 64 in the graphene film 35 provide space for molecules in, for example, a resin matrix material 32 to penetrate the holes 64 and be mechanically constrained by the graphene film 35, thereby further improving bonding capabilities.

Referring again to FIGS. 3-5, the graphene film 35 is wrapped about one or more carbon fiber filaments 36 in a spiral orientation. Successive layers of the graphene film 35 partially overlap previous wrapped layers of graphene film 35 such that the functionalized area 52 on the outer surface 48 of the graphene film 35 is not covered, and remains exposed. In certain embodiments, the graphene film 35 is wrapped about the one or more carbon fiber filaments 36 to a thickness of about 0.1 microns to about 3.0 microns to form about 300 to about 9,000 layers of graphene film 35 on top of the one or more carbon fiber filaments 36. The diameter of the wrapped graphene-augmented carbon fibers 34A, 34B, 34C should be in the range of about 1 micron to about 7 microns, and about 5 microns to about 7 microns for use in aerospace applications. During the wrapping process, one or more carbon fiber filaments 36 are positioned to move in a lengthwise direction under tension to keep the carbon fiber filaments 36 taut.

In FIGS. 3-5, the single carbon fiber filament 36, the bundle 37 of carbon fiber filaments 36, and the bed 38 of carbon fiber filaments 36 are positioned to move in a horizontal direction to the right as shown by arrow D. A spool 42 of graphene film 35 is rotated around the single carbon fiber filament 36, the bundle 37 of carbon fiber filaments 36, and the bed 38 of carbon fiber filaments 36, at an angle A of 0.6 degrees or less such that when unrolled from the spool and wrapped around the moving one or more carbon fiber filaments 36, the graphene film 35 wraps in a spiral orientation. Other orientations and arrangements can also be employed. A corner of the loose end of the graphene film 35 may be attached to the one or more carbon fiber filaments 36 to start the wrapping process and to pull the graphene film 35 as the one or more carbon fiber filaments 36 moves in the direction D. The wrapping angle A leads to a ratio of 1 width to 100 length. As the graphene film 35 is wrapped around the one or more carbon fiber filaments 36, successive layers of the graphene film 35 overlap previously wrapped layers. If the wrapped graphene-augmented carbon fibers 34A, 34B have a final diameter of 5 microns and was rolled at 0.6 degree angle A, the graphene film 35 will has an offset distance between overlaps of 50 microns. The graphene film 35 should be maintained to have a tension of about 0.001 Newtons (N) per meter width of graphene film 35, and the speed may be adjusted depending on the desired result. If the graphene film 35 is wrapped in a slow manner, a spiral on the surface of the carbon fiber filaments 36 will have considerable space between the adjacent wraps of the graphene film 35 (or filament length between adjacent wraps of graphene film 35). The space or filament length between adjacent wraps is preferably 0 microns to 10 microns. For this application, the entire outer surface 48 of the graphene film 35 may be functionalized with amine groups 50 and both the first edge 44 and the second edge 46 of the graphene film 35 may be functionalized with epoxide groups 54. In the preferred embodiments, the graphene film 35 is wrapped in a faster manner, resulting in many layers of graphene film 35 rolled atop each other in an offsetting spiral orientation. The graphene film 35 should be wrapped tight enough around the carbon fiber filaments 36 such that there is no space between the graphene film 35 and the carbon fiber filament 36.

FIG. 3 shows one embodiment of a graphene-augmented carbon fiber 34A comprising a single carbon fiber filament 36 wrapped with a graphene film 35 as disclosed above. In this embodiment, the outer surface 48 of the graphene film 35 may be functionalized with amine groups 50 in the functionalized area 52 and epoxide groups on the first edge 44 also in the functionalized area 52. Holes 64 are not necessary for graphene film 35 in this embodiment. The wrapping process provides that the functionalized area 52 is on the outside of the graphene-augmented carbon fiber 34A and in the outermost few nanometers of the graphene-augmented carbon fiber 34A, resulting from the wrapped layers of functionalized graphene film 35. Graphene-augmented carbon fibers 34A may be used to form CFRP composite materials 28 using the same equipment and processes that are used with traditional carbon fibers. For example, thousands to hundreds of thousands of graphene-augmented fibers 34A may be combined together or may be combined with traditional carbon fibers to form a fiber bed, which is then impregnated with a resin matrix material 32 to form a composite prepreg material. The composite prepreg material can be formed into a composite structure and cured. In this embodiment, there is a significant amount of perfectly crystalline graphene in the outermost few nanometers of the graphene-augmented carbon fiber 34A to improve modulus and the strength of interactions between the graphene-augmented fibers and the resin matrix material 32.

Carbon fiber filaments 36 used in all embodiments are separated from a carbon fiber tow 40. Carbon fiber tows 40 are commercially available from many sources, and typically comprise thousands of individual carbon fiber filaments 36. For example, carbon fiber tows 40 having 1,000 carbon fiber filaments 36, 3,000 carbon fiber filaments 36, 6,000 carbon fiber filaments 36, 12,000 carbon fiber filaments 36 or 24,000 carbon fiber filaments 36 are typical in the aerospace industry. Outside of aerospace, carbon fiber tows 40 having up to about 300,000 carbon fiber filaments 36 are available.

FIG. 4 shows another embodiment of a graphene-augmented carbon fiber 34B comprising a substantially cylindrical bundle 37 of 19 carbon fiber filaments 36 wrapped with a graphene film 35 as disclosed above. Bundles 37 may also comprise groups of 7, 37 or 61 carbon fiber filaments 36, or any other suitable quantity of carbon fiber filaments. In this embodiment, the graphene film 35 has a width of about 0.5 microns to about 10 microns and has holes 64 through the graphene film 35. The holes 64 are substantially circular and have a diameter of about 1 to about 20 nanometers, and preferably have a size greater than about 100 carbon atoms. Holes 64 may be positioned anywhere in the graphene film 35. The graphene film 35 has a density of holes in the range of about 4E7 to about 4E10 holes per square millimeter, or about one hole per 1,000 to 1 million carbon atoms. The holes 64 create additional edges 66 with a large number of edge atoms. The graphene film 35 may also have a functionalized area 52 as disclosed above. The graphene film 35 squeezes each bundle 37 of carbon fiber filaments 36 to a minimum size, which for a bundle 37 of 19 carbon fiber filaments 36 is a graphene-augmented carbon fiber 34B in the form of a five-filament diameter 72 close-packed, hexagonal-shaped, super-filament bundle 74. The graphene-augmented carbon fiber 34B of this embodiment may be used by itself to make composite materials 28, or it may be bundled with additional graphene-augmented carbon fibers 34B to form, for example, a 3,000 (158×19) or 6,000 (316×19), or greater, filament bundle, which can be spooled for use in making composite materials 28. Composite materials 28 may be made using graphene-augmented carbon fibers 34B in accordance with known equipment and processes, such as the process disclosed above with regard to single filament graphene-augmented carbon fiber 34A. During the composite material production process, additional time will be necessary to permit the resin matrix material 32 to flow and penetrate through the holes 64 in the graphene film 35 before spreading through the super-filament bundle(s) 74 of the graphene-augmented carbon fiber 34B. The graphene-augmented carbon fibers 34B have an increased uniformity of dispersion in a composite material 28 because the graphene-augmented carbon fibers 34B are packed tightly together.

FIG. 5 shows another embodiment where a graphene-augmented bed 34C of carbon fiber filaments 36 comprises a substantially rectangular bed 38 of carbon fiber filaments 36 separated from a plurality of carbon fiber tows 40, and wrapped with a graphene film 35 as disclosed above. Any overlap areas of the wrapped graphene film 35 should be minimized for this embodiment. The rectangular bed 38 is about 12 inches wide and about 250 microns thick, and comprises about 600,000 carbon fiber filaments 36. The rectangular bed 38 may comprise any other suitable widths and thicknesses, comprising any suitable quantity of carbon fiber filaments 36. The carbon fiber filaments of the rectangular bed 38 are generally aligned along the length wise direction, or the direction of the arrow in FIG. 5, but the filaments 36 may have variations such as cross-over, spiraling or twist. The carbon fiber filaments 36 may be in the form of 600 carbon fiber tows 40, each carbon fiber tow 40 having 1,000 carbon fiber filaments. Other configurations may also be used. In this embodiment, the graphene film 35 has a width of about 0.5 microns to about 100 microns and has holes 64 through the graphene film 35. The holes 64 are substantially circular and have a diameter of about 1 to about 20 nanometers, and preferably have a size greater than about 100 carbon atoms. Holes 64 may be positioned anywhere in the graphene film 35. The graphene film 35 has a density of holes in the range of about 4E7 to about 4E10 holes per square millimeter, or about one hole per 1,000 to 1 million carbon atoms. The holes 64 create additional edges 66 with a large number of edge atoms. The graphene film 35 may also have a functionalized area 52 as disclosed above.

Figure 9:
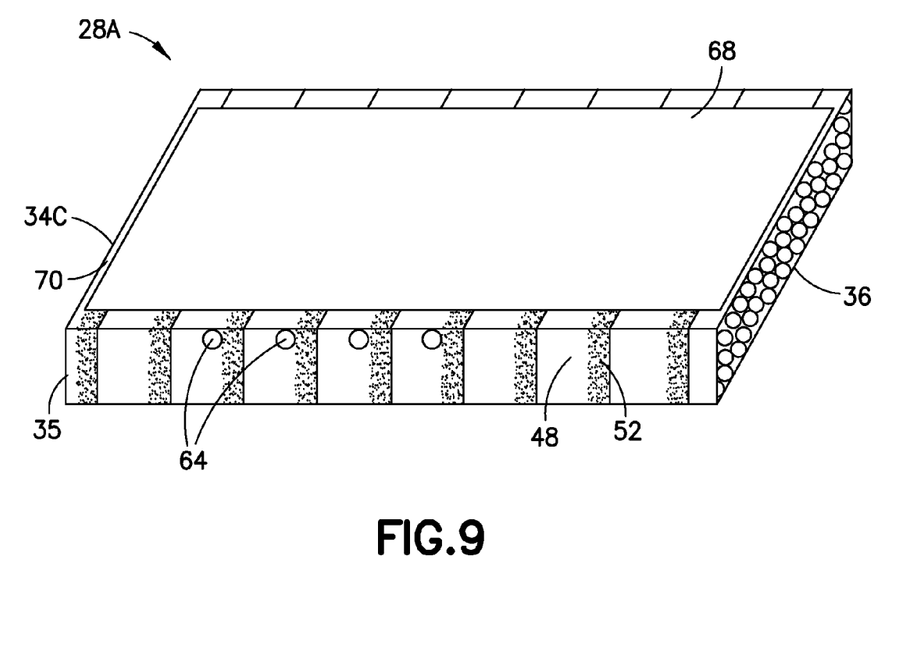
FIG. 9 is an illustration of a composite material comprising a resin material and the bed of carbon fiber filaments formed in FIG. 5.

Referring to FIG. 9, the graphene-augmented carbon fiber 34C in FIG. 5 may be used in producing a composite material 28A by applying a resin film 68 onto a top surface 70 of the wrapped bed 38 of carbon fiber filaments 36, and then heating to allow the resin to flow to form a prepreg material in accordance with known processes and equipment. Additional time will be necessary to permit the resin film 70 to flow and penetrate through the holes 64 in the graphene film 35 before spreading through the bed 38 of carbon fiber filaments 36 of the graphene-augmented carbon fiber 34C.

Figure 10:
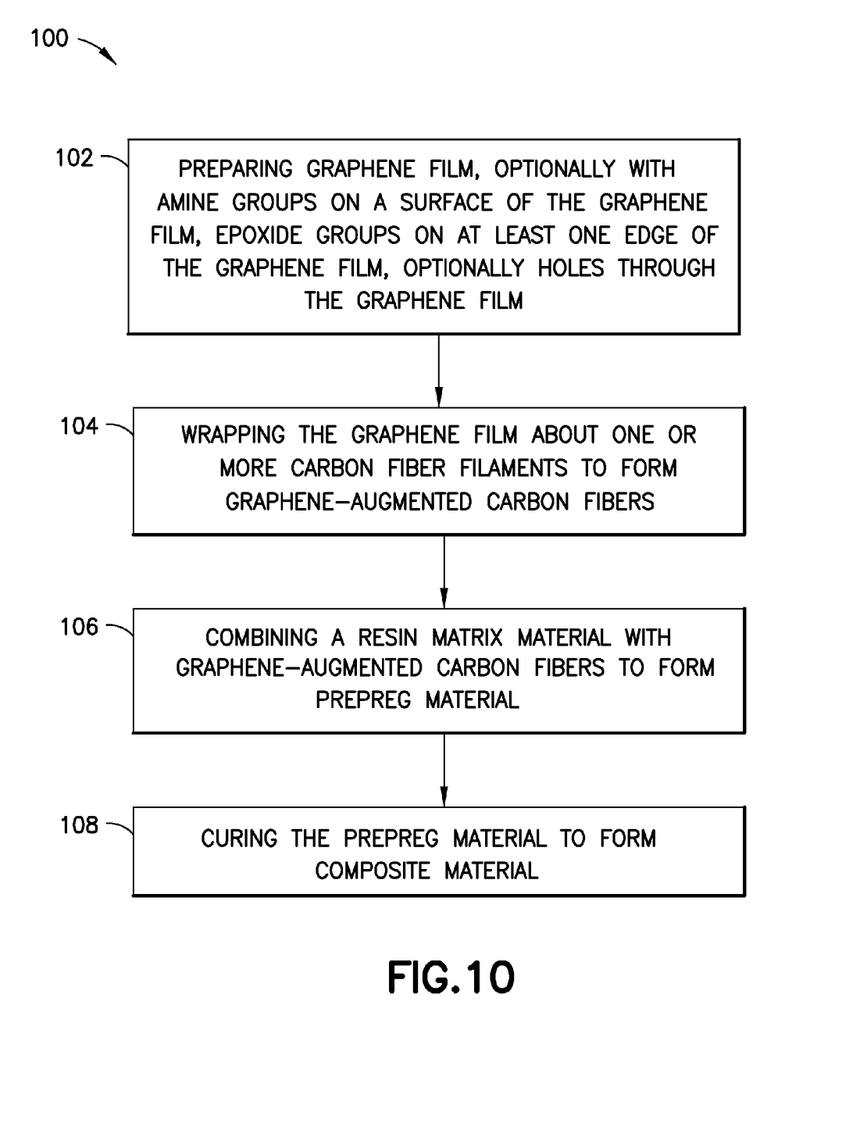
FIG. 10 is an illustration of a flow diagram of an exemplary method for increasing the strength, modulus and stiffness of a composite material.

FIG. 10 is an illustration of a flow diagram of an exemplary embodiment of a method 100 of increasing strength, modulus and stiffness of a composite material (like the composite material 28 shown in FIG. 2) comprising carbon reinforcement fibers 30 and a resin matrix material 32. The method 100 comprises step 102 of preparing a graphene film 35 optionally having amine groups 50 formed on an outer surface 48 of the graphene film 35, epoxide groups 54 formed on at least one of the first edge 44 and second edges 46 of the graphene film 35, and/or holes 44 formed through the graphene film 35 in accordance with the disclosure above.

In step 104, the graphene film 35 is wrapped about one or more carbon fiber filaments 36 to form graphene-augmented carbon fibers 34A, 34B, or a graphene-augmented bed 34C of carbon fiber filaments 36 in accordance with the disclosure above. In this step, the graphene film 35 may be wrapped around a single carbon fiber filament 36 as shown in FIG. 3, a substantially cylindrical bundle 37 of 7, 19, 37 or 61 carbon fiber filaments 36, or any other suitable quantity of carbon fiber filaments, as shown in FIG. 4, a substantially rectangular bed 38 of carbon fiber filaments from a plurality of carbon fiber tows 40 as shown in FIG. 5, or any other number and arrangement of carbon fiber filaments 36.

In step 106, a plurality of graphene-augmented carbon fibers 34A, 34B or the graphene-augmented bed 34C are combined with a resin matrix material 32 to form a prepreg material. The prepreg material may comprise the graphene-augmented carbon fibers 34A, 34B in unidirectional (aligned) or fabric (woven) form, impregnated to a desired amount with the resin matrix material 32. Preferably, the graphene-augmented carbon fibers 34A, 34B and graphene-augmented bed 34C are pre-impregnated with uncured resin matrix material 32 using equipment and processes known in the art for making prepreg materials. Alternatively, a resin film 68 may be placed on top of the wrapped bed 38 of carbon fiber filaments 36. In step 108, the prepreg material is cured to form a composite material 28 using equipment and processes known in the art for curing prepreg materials.

Many other modifications and variations may of course be devised given the above description of various embodiments for implementing the principles in the present disclosure. For example, and without limitation, the same technology may be applied to fabric forms of prepreg materials where the carbon fibers are not aligned. It is intended that all such modifications and variations be considered as within the spirit and scope of this disclosure, as defined in the following claims.

The invention claimed is:

1. A graphene-augmented carbon fiber comprising a graphene film wrapped about a carbon fiber filament.

2. The graphene-augmented carbon fiber of claim 1, wherein the graphene film is wrapped about the carbon fiber filament in a spiral orientation.

3. The graphene-augmented carbon fiber of claim 2, wherein the graphene film is wrapped about the carbon fiber filament to a thickness of about 0.1 to about 3.0 microns to form about 300 to about 9,000 layers of the graphene film on top of the carbon fiber filament.

4. The graphene-augmented carbon fiber of claim 1, wherein the graphene film has amine groups formed on an outer surface of the graphene film and epoxide groups formed on at least one edge of the graphene film.

5. The graphene-augmented carbon fiber of claim 4, wherein the amine groups are formed in a functionalized area on the outer surface of the graphene film that is within about 10 microns from the at least one edge of the graphene film.

6. The graphene-augmented carbon fiber of claim 5, wherein the amine groups in the functionalized area on the outer surface of the graphene film have a surface density of about 4.0E10 to about 2.0E12 groups per square millimeter of the functionalized area.

7. The graphene-augmented carbon fiber of claim 5, wherein about 0.1% to about 5.0% of carbon atoms in the functionalized area of the graphene film have amine groups bonded thereto.

8. The graphene-augmented carbon fiber of claim 4, wherein the graphene film has a linear density of epoxide groups formed on the at least one edge of about 7,000 to about 700,000 groups per millimeter.

9. The graphene-augmented carbon fiber of claim 4, wherein about 0.1% to about 10% of carbon atoms at the least one edge of the graphene film have epoxide groups bonded thereto.

10. The graphene-augmented carbon fiber of claim 1, wherein the graphene film is about 0.5 microns to about 100 microns wide.

11. The graphene-augmented carbon fiber of claim 4, wherein the graphene film further comprises at least one hole formed through the graphene film.

12. The graphene-augmented carbon fiber of claim 11, wherein the holes are substantially circular and have a diameter of 1-2 nanometers.

13. The graphene-augmented carbon fiber of claim 11, wherein the graphene film has a density of holes in the range of about 4E7 to about 4E10 holes per square millimeter, or about one hole per 1,000 to 1 million carbon atoms.

14. The graphene-augmented carbon fiber of claim 11, wherein the holes have a size of about 12-80 carbon atoms.

15. The graphene-augmented carbon fiber of claim 1, wherein the graphene film is wrapped around a substantially cylindrical bundle of at least one of 7, 19, 37 or 61 carbon fiber filaments.

16. The graphene-augmented carbon fiber of claim 15, wherein the graphene film is about 0.5 microns to about 10 microns wide.

17. The graphene-augmented carbon fiber of claim 15, wherein the graphene film comprises holes formed through the graphene film.

18. The graphene-augmented carbon fiber of claim 17, wherein the holes are substantially circular and have a diameter of 1-20 nanometers.

19. The graphene-augmented carbon fiber of claim 17, wherein the holes have a size of greater than about 100 carbon atoms.

20. The graphene-augmented carbon fiber of claim 19, wherein the graphene film has a density of holes in the range of about 4E7 to about 4E10 holes per square millimeter, or about one hole per 1,000 to 1 million carbon atoms.

21. The graphene-augmented carbon fiber of claim 17, wherein the graphene film is wrapped about the substantially cylindrical bundle of at least one of 7, 19, 37 or 61 carbon fiber filaments in a spiral orientation.

22. The graphene-augmented carbon fiber of claim 21, wherein the graphene film is wrapped about the cylindrical bundle of at least one of 7, 19, 37 or 61 carbon fiber filaments to a thickness of about 0.1 to about 3.0 microns to form about 300 to about 9,000 layers of the graphene film on top of the carbon fiber filaments.

23. The graphene-augmented carbon fiber of claim 17, wherein the graphene film has amine groups formed on an outer surface of the graphene film and epoxide groups formed on at least one edge of the graphene film.

24. The graphene-augmented carbon fiber of claim 23, wherein the amine groups are formed in a functionalized area on the outer surface of the graphene film that is within about 10 microns from the at least one edge of the graphene film.

25. A graphene-augmented bed of carbon fiber, comprising a graphene film wrapped around a substantially rectangular bed of carbon fiber filaments separated from a plurality of carbon fiber tows.

26. The graphene-augmented bed of carbon fiber of claim 25, wherein the substantially rectangular bed of carbon fiber filaments is about 12 inches wide and about 250 microns thick.

27. The graphene-augmented bed of carbon fiber of claim 25, wherein the substantially rectangular bed of carbon fiber filaments comprises about 600,000 of the carbon fiber filaments.

28. The graphene-augmented bed of carbon fiber of claim 25, wherein the graphene film is about 0.5 microns to about 100 microns wide.

29. The graphene-augmented bed of carbon fiber of claim 25, wherein the graphene film comprises substantially circular holes formed through the graphene film having a diameter of 1-20 nanometers.

30. The graphene-augmented bed of carbon fiber of claim 29, wherein the graphene film has a density of holes in the range of about 4E7 to about 4E10 holes per square millimeter, or about one hole per 1,000 to 1 million carbon atoms.

31. The graphene-augmented bed of carbon fiber of claim 25, wherein the graphene film is wrapped about the rectangular bed of carbon fiber filaments in a spiral orientation.

32. The graphene-augmented bed of carbon fiber of claim 31, wherein the graphene film is wrapped about the rectangular bed of carbon fiber filaments to a thickness of about 0.1 to about 3.0 microns to form about 300 to about 9,000 layers of the graphene film on top of the carbon fiber filaments.

33. The graphene-augmented bed of carbon fiber of claim 29, wherein the graphene film has amine groups formed on an outer surface of the graphene film and epoxide groups formed on at least one edge of the graphene film.

34. The graphene-augmented bed of carbon fiber of claim 33, wherein the amine groups are formed in a functionalized area on the outer surface of the graphene film that is within about 10 microns from the at least one edge of the graphene film.

35. A composite material comprising the graphene-augmented carbon fiber of claim 1 and a matrix material.

36. A composite material comprising the graphene-augmented carbon fiber of claim 15 and a matrix material.

37. A composite material comprising the graphene-augmented carbon fiber of claim 25 and a matrix material.

38. A method of increasing strength of a composite material comprising carbon reinforcement fibers and a resin matrix material, the method comprising:
wrapping a graphene film about each of the carbon reinforcement fibers in a spiral orientation to form graphene-augmented carbon fibers;
combining the resin matrix material with a plurality of the graphene-augmented carbon fibers to form a prepreg material; and
curing the prepreg material to form the composite material.

39. The method of claim 38, wherein each of the carbon reinforcement fibers in the graphene-augmented carbon fibers comprises a carbon fiber filament.

40. The method of claim 38, wherein each of the carbon reinforcement fibers in the graphene-augmented carbon fibers comprises a substantially cylindrical bundle of at least one of 7, 19, 37 or 61 carbon fiber filaments.

41. The method of claim 38, wherein each of the carbon reinforcement fibers in the graphene-augmented carbon fibers comprises a substantially rectangular bed of carbon fiber filaments separated from a plurality of carbon fiber tows.

42. The method of claim 38, further comprising forming amine groups on an outer surface of the graphene film and epoxide groups on at least one edge of the graphene film.

43. The method of claim 42, wherein the amine groups are formed on the outer surface of the graphene film in a functionalized area that is within about 10 microns from the at least one edge of the graphene film.

44. The method of claim 38, wherein the graphene film is wrapped about the carbon reinforcement fibers to a thickness of about 0.1 to about 3.0 microns to form about 300 to about 9,000 layers of the graphene film on top of the carbon fiber.

45. The method of claim 38, further comprising forming holes through the graphene film having a substantially circular shape and a diameter of 1-20 nanometers.

46. The method of claim 45, wherein the graphene film has a density of holes in the range of about 4E7 to about 4E10 holes per square millimeter, or about one hole per 1,000 to 1 million carbon atoms.

47. The method of claim 45, wherein the step of wrapping a graphene film about each of the carbon reinforcement fibers comprises wrapping the graphene film to a thickness of about 0.1 to about 3.0 microns to form about 300 to about 9,000 layers of the graphene film on top of the bed of carbon reinforcement fibers.

* * * * *